US008375371B2

(12) United States Patent
Fink et al.

(10) Patent No.: US 8,375,371 B2
(45) Date of Patent: Feb. 12, 2013

(54) IMPORTANCE-BASED CALL GRAPH CONSTRUCTION

(75) Inventors: Stephen Fink, Yorktown Heights, NY (US); Yinnon Avraham Haviv, Beerotaim (IL); Marco Pistoia, Amawalk, NY (US); Omer Tripp, Har-Adar (IL); Omri Weisman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/437,894

(22) Filed: May 8, 2009

(65) Prior Publication Data

US 2010/0284527 A1 Nov. 11, 2010

(51) Int. Cl.
*G06F 9/44* (2006.01)
(52) U.S. Cl. .......................... 717/132; 717/127
(58) Field of Classification Search .................. None
See application file for complete search history.

(56) References Cited

U.S. PATENT DOCUMENTS

| 5,790,858 | A | * | 8/1998 | Vogel | 717/130 |
| 5,828,883 | A | | 10/1998 | Hall | |
| 6,857,120 | B1 | | 2/2005 | Arnold et al. | |
| 7,386,838 | B2 | * | 6/2008 | Schmidt | 717/130 |
| 8,108,826 | B2 | * | 1/2012 | Li et al. | 717/106 |
| 2004/0199904 | A1 | * | 10/2004 | Schmidt | 717/130 |
| 2006/0218543 | A1 | | 9/2006 | Boger | |

OTHER PUBLICATIONS

Power Point seminar presentation entitled "Identifying use cases in source code" based on article by Zhang et al., (Jan. 2008), Software Engineering Lab, KAIST, 19 pp.

* cited by examiner

*Primary Examiner* — Jason Mitchell
(74) *Attorney, Agent, or Firm* — Kali Law Group, P.C.

(57) ABSTRACT

A system and method for importance-based call graph construction, including a) analyzing a computer software application to identify a plurality of calls within the computer software application, b) assigning an importance value to any of the calls in accordance with a predefined importance rule, c) selecting any of the calls for inclusion in a call graph in accordance with a predefined inclusion rule, d) representing the call in the call graph, e) adjusting the importance value of any call represented in the call graph in accordance with a predefined importance adjustment rule, and f) iteratively performing any of steps a)-e) until a predefined termination condition is met.

18 Claims, 6 Drawing Sheets

IMPORTANCE-BASED CALL GRAPH CONSTRUCTION

FIELD OF THE INVENTION

The invention relates to computer software analysis and testing in general, and more particularly to constructing call graphs for computer software applications in support of computer software analysis and testing.

BACKGROUND OF THE INVENTION

Call graphs are powerful tools in describing and analyzing large and complex software applications, and are very useful for testing and debugging such applications. A dynamic call graph, describing a specific execution of a software application out of many possibilities, is relatively easy to construct, but provides only a narrow view of the application it represents, and thus, the scope of analysis that one can perform using dynamic call graphs is limited. To remedy this, a static call graph may be constructed of a software application by analyzing the application source code and representing all possible executions of the application. However, the computational requirements of existing methods for constructing static call graphs, as well as the storage requirements for static call graphs themselves, may entail resource requirements that exceed available resources. Methods for constructing static call graphs that have reduced resource requirements would therefore be advantageous.

SUMMARY OF THE INVENTION

The invention in embodiments thereof discloses novel systems and methods for constructing call graphs that have reduced resource requirements.

In one aspect of the invention a method is provided for importance-based call graph construction, the method including a) analyzing a computer software application to identify a plurality of calls within the computer software application, b) assigning an importance value to any of the calls in accordance with a predefined importance rule, c) selecting any of the calls for inclusion in a call graph in accordance with a predefined inclusion rule, d) representing the call in the call graph, e) adjusting the importance value of any call represented in the call graph in accordance with a predefined importance adjustment rule, and f) iteratively performing any of steps a)-e) until a predefined termination condition is met.

In another aspect of the invention the analyzing step includes identifying a callee of any of the calls represented in the call graph.

In another aspect of the invention the analyzing step includes identifying a callee of any of the calls most recently represented in the call graph.

In another aspect of the invention the selecting step includes selecting the call having the greatest importance value among the calls not represented in the call graph.

In another aspect of the invention the adjusting step includes increasing the importance value of any of the calls represented in the call graph such that no call that is represented in the call graph is more important than any of its neighboring calls in the call graph by more than one degree of importance.

In another aspect of the invention the iteratively performing step includes iteratively performing any of steps a)-e) until a predefined maximum number of calls are represented in the call graph.

In another aspect of the invention a system is provided for importance-based call graph construction, the system including a static analyzer configured to analyze a computer software application to identify a plurality of calls within the computer software application, an importance value assigner configured to assign an importance value to any of the calls in accordance with a predefined importance rule, a candidate selector configured to select any of the calls for inclusion in a call graph in accordance with a predefined inclusion rule, and represent the call in the call graph, and an importance value adjuster configured to adjust the importance value of any call represented in the call graph in accordance with a predefined importance adjustment rule, where any of the static analyzer, importance value assigner, candidate selector, and importance value adjuster are implemented in either of computer hardware and computer software and embodied in a computer-readable medium.

In another aspect of the invention any of the static analyzer, importance value assigner, candidate selector, and importance value adjuster are configured to cooperate iteratively until a predefined termination condition is met.

In another aspect of the invention the static analyzer is configured to identify a callee of any of the calls represented in the call graph.

In another aspect of the invention the static analyzer is configured to identify a callee of any of the calls most recently represented in the call graph.

In another aspect of the invention the candidate selector is configured to select the call having the greatest importance value among the calls not represented in the call graph.

In another aspect of the invention the importance value adjuster is configured to increase the importance value of any of the calls represented in the call graph such that no call that is represented in the call graph is more important than any of its neighboring calls in the call graph by more than one degree of importance.

In another aspect of the invention the termination condition is met when a predefined maximum number of calls are represented in the call graph.

In another aspect of the invention a computer program product is provided for constructing an importance-based call graph, the computer program product including a computer readable medium, and computer program instructions operative to analyze a computer software application to identify a plurality of calls within the computer software application, assign an importance value to any of the calls in accordance with a predefined importance rule, select any of the calls for inclusion in a call graph in accordance with a predefined inclusion rule, represent the call in the call graph, and adjust the importance value of any call represented in the call graph in accordance with a predefined importance adjustment rule, where the computer program instructions are operative to be performed iteratively until a predefined termination condition is met, and where the program instructions are stored on the computer readable medium.

In another aspect of the invention the computer program instructions are operative to identify a callee of any of the calls represented in the call graph.

In another aspect of the invention the computer program instructions are operative to identify a callee of any of the calls most recently represented in the call graph.

In another aspect of the invention the computer program instructions are operative to selecting the call having the greatest importance value among the calls not represented in the call graph.

In another aspect of the invention the computer program instructions are operative to increase the importance value of any of the calls represented in the call graph such that no call that is represented in the call graph is more important than any of its neighboring calls in the call graph by more than one degree of importance.

In another aspect of the invention the computer program instructions are operative to be performed iteratively until a predefined maximum number of calls are represented in the call graph.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
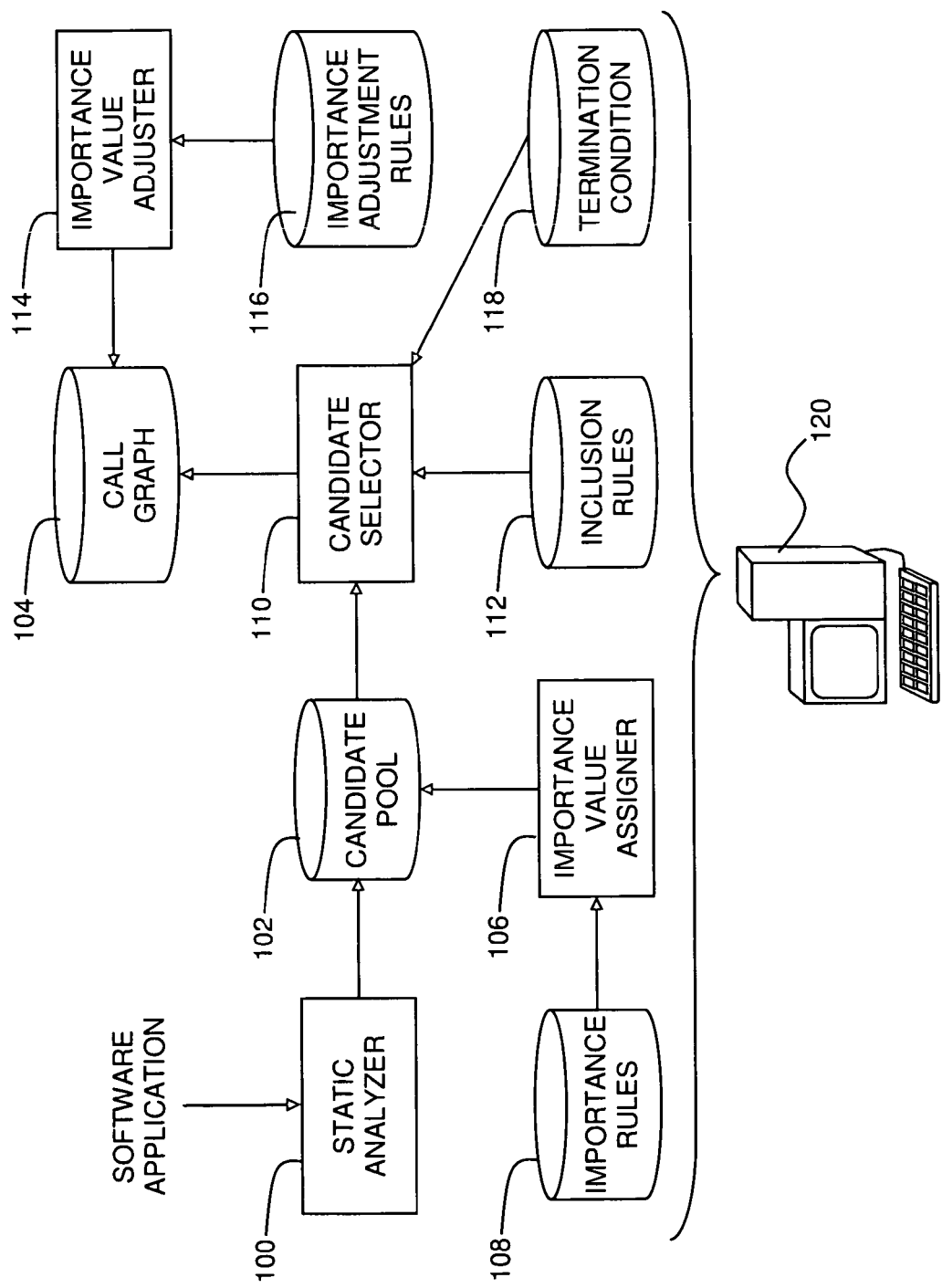
FIG. 1 is a simplified conceptual illustration of an importance-based call graph construction system, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of an importance-based call graph construction system, constructed and operative in accordance with an embodiment of the invention. In the system of FIG. 1, a static analyzer 100 uses conventional methods to statically analyze the instructions of a computer software application, such as where the instructions are in the form of source code or bytecode, to identify calls, such as to methods or procedures. Each identified call is represented in a candidate pool 102 of calls that are considered for representation as nodes in a call graph 104. An importance value assigner 106 preferably assigns a predefined importance value to any of the candidates in pool 102 in accordance with predefined importance rules 108. A candidate selector 110 preferably selects any candidates in pool 102 for removal from pool 102 and representation as a node in call graph 104 in accordance with predefined inclusion rules 112. Each time a node is added to call graph 104 an importance value adjuster 114 preferably adjusts the importance value of any calls represented as nodes in call graph 104 in accordance with importance adjustment rules 116. Candidates are removed from pool 102 and included in call graph 104 in this manner until a predefined termination condition 118 is met, such as where a predefined maximum number of calls have been represented as nodes in call graph 104.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer 120.

Figure 2:
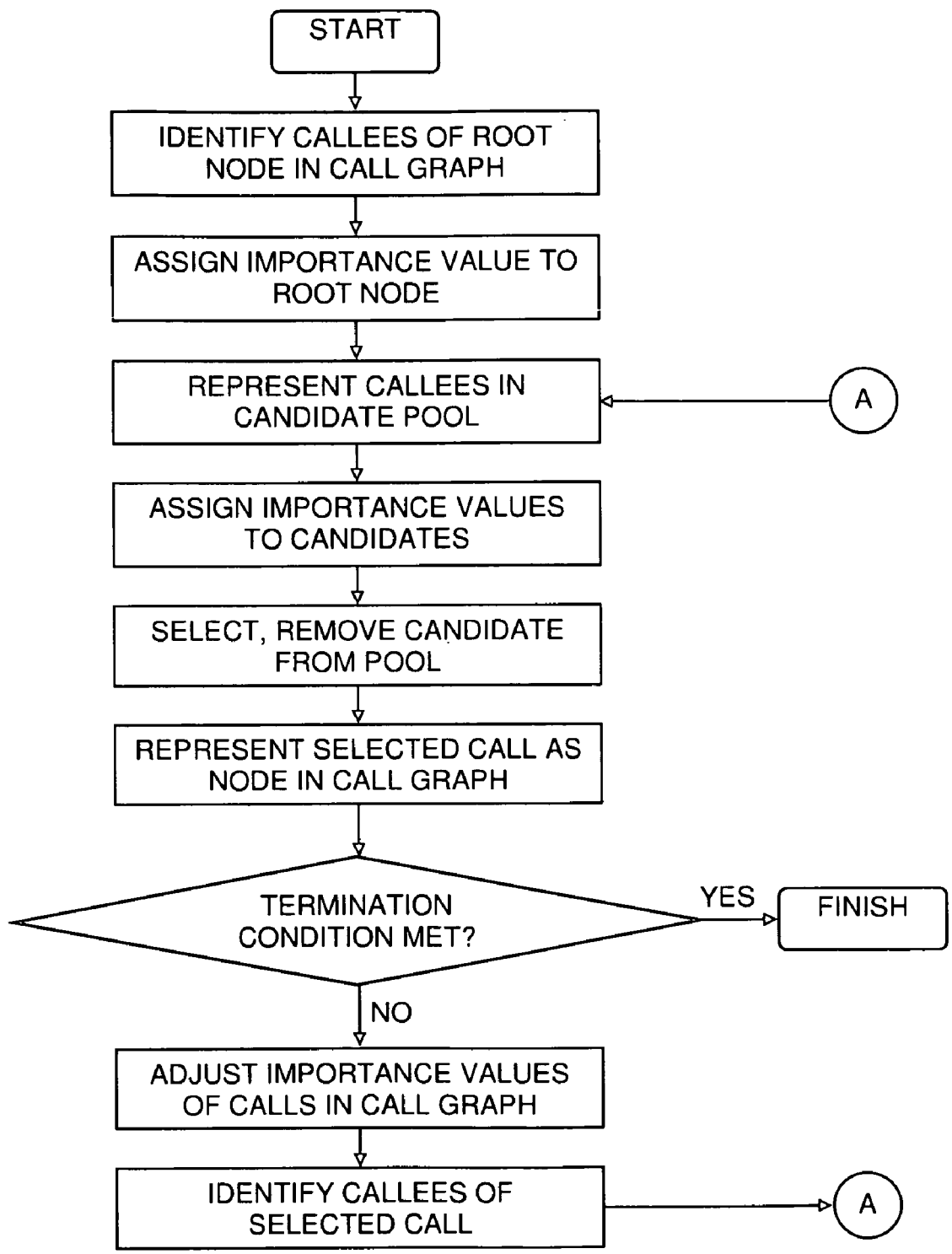
FIG. 2 is a simplified flowchart illustration of an exemplary method of operation of the system of FIG. 1 operative in accordance with an embodiment of the invention.

Reference is now made to FIG. 2 which is a simplified flowchart illustration of an exemplary method of operation of the system of FIG. 1 operative in accordance with an embodiment of the invention. In the method of FIG. 2 a root node is used to form the basis of a call graph for a computer software application in accordance with conventional static analysis call graph construction techniques. The root node is analyzed using conventional static analysis techniques to identify any calls, such as to methods or procedures, that originate from the root node. These "callees" are each represented in a candidate pool. The root node and the candidates that are represented in the candidate pool are all assigned predefined importance values in accordance with predefined importance rules as may be applicable. For example, importance rules may be defined such that the highest importance value is to be assigned to calls to methods that are found in one particular JAVA™ library that is of greatest interest to a software tester, whereas a lower importance value is to be assigned to calls to methods that are found in another JAVA™ library that is of less interest. Any value system may be used to represent importance values, such as an integer-based system where the value "0" represents the highest importance, the value "1" representing one degree of less importance, and so on.

A candidate in the pool is selected, removed from the pool, and represented as a node in the call graph in accordance with predefined inclusion rules, such as may dictate that the candidate with the greatest importance value be removed from the pool and represented in the call graph. Each time a node is added to the call graph the importance value of any call represented in the call graph may be adjusted in accordance with predefined importance adjustment rules. For example, importance adjustment rules may be defined to require that the importance value of any call represented in the call graph be increased such that no call in the call graph is more important than any of its neighboring calls by more than one degree of importance. This may be useful, for example, where the methods corresponding to neighboring calls are assumed to be close to each other in importance.

Callees of calls that are represented in the call graph are identified, added to the candidate pool, and assigned predefined importance values as described above. Preferably, this is done for a call after it is represented in the call graph and before the next candidate is selected. The process above of identifying callees, representing callees in the candidate pool, assigning importance values to candidates, selecting and removing candidates from the pool, representing selected candidates as nodes in the call graph, and adjusting importance values of calls represented in the call graph is preferably repeated until a predefined termination condition is met, such as where a predefined maximum number of calls are represented in the call graph.

Figure 3A:
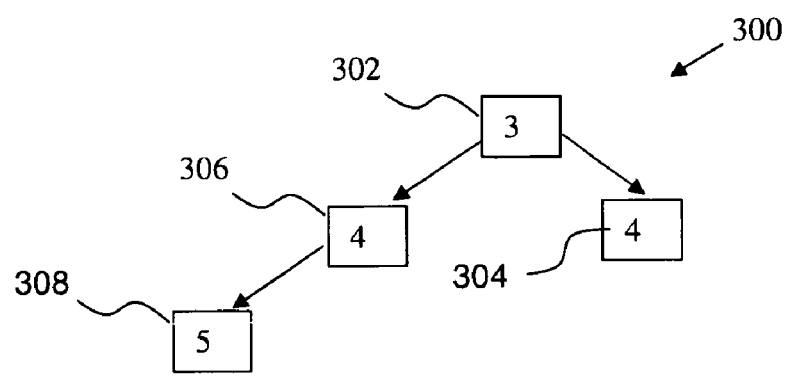
FIGS. 3A-3H are simplified graphical illustrations of exemplary results of an implementation of the method of FIG. 2.
Figure 3B:
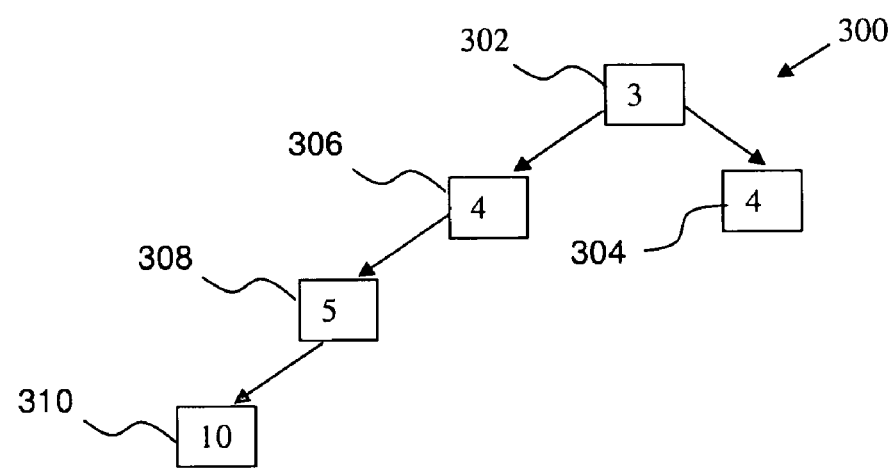
Figure 3C:
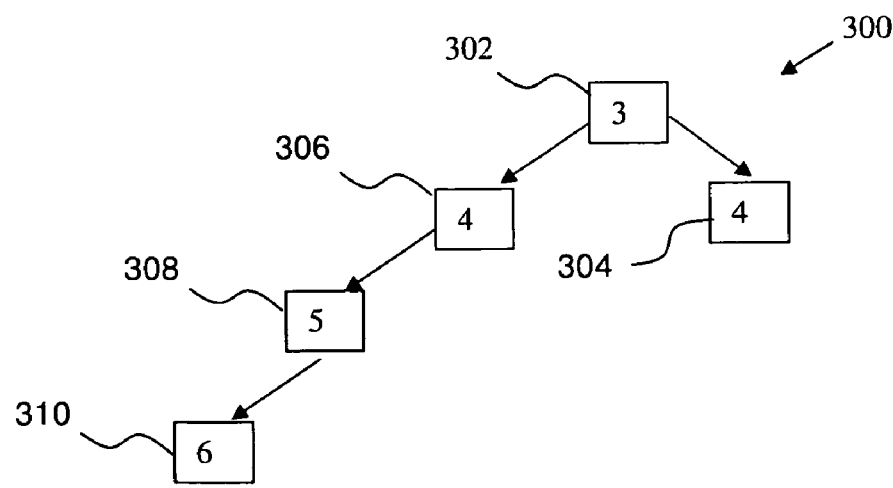
Figure 3D:
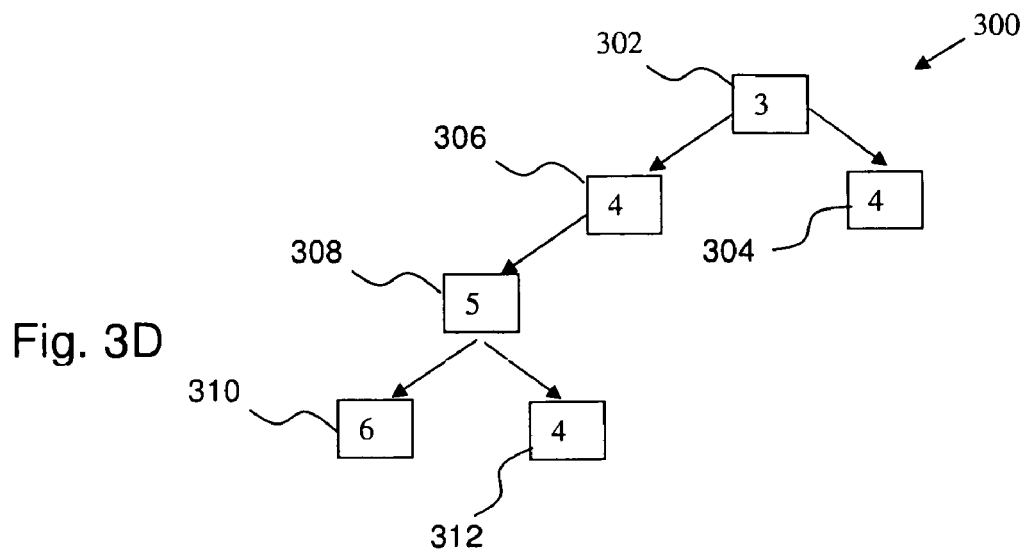

Reference is now made to FIGS. 3A-3H, which as simplified graphical illustrations of exemplary results of an implementation of the method of FIG. 2. In FIG. 3A a call graph 300 of four nodes 302, 304, 306, and 308, is shown with node importance values displayed as positive integers. (A reference herein to the importance value of a node is to be understood as a reference to the importance value of the call that the node represents.) In FIG. 3B a node 310 having an importance value of 10 is shown having been added to graph 300, node 310 being a callee of node 308 that was removed from the node candidate pool for inclusion in call graph 300. In FIG. 3C the importance value of node 300 is shown as having been adjusted to have an importance value that is one degree less than the importance value of its immediate neighbor, node 308. As all other pairs of neighboring nodes in FIG. 3C have equal importance values or differ in importance by no more than one degree, no further adjustment is required of the importance values of the nodes in graph 300. In FIG. 3D a node 312 having an importance value of 4 is added to graph 300, requiring no adjustment of the importance values of the nodes in graph 300.

Figure 3E:
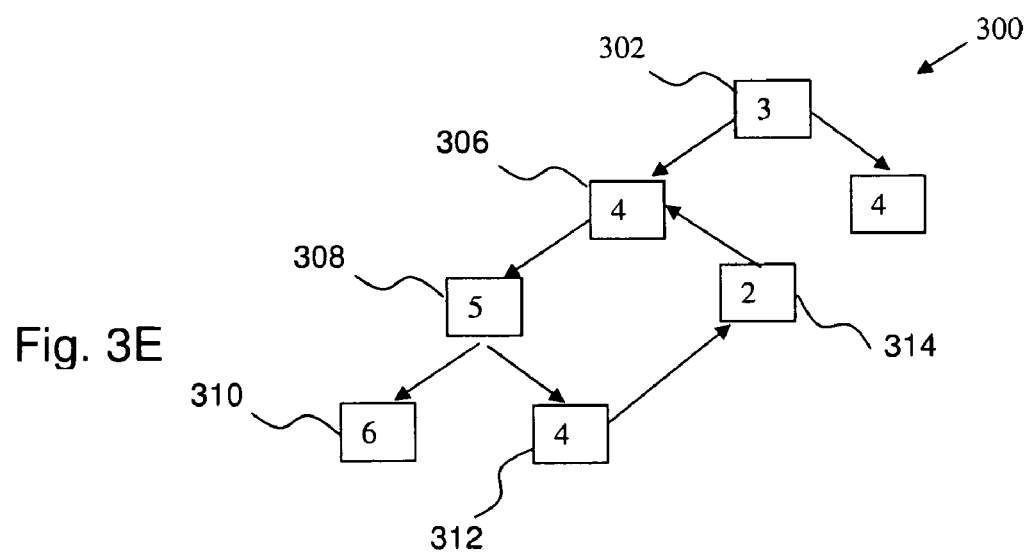
Figure 3F:
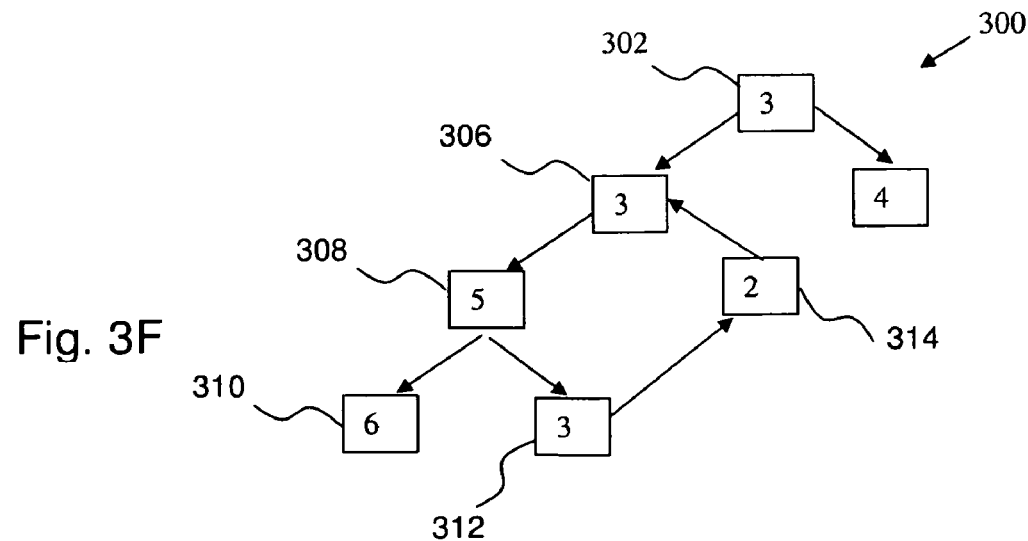
Figure 3G:
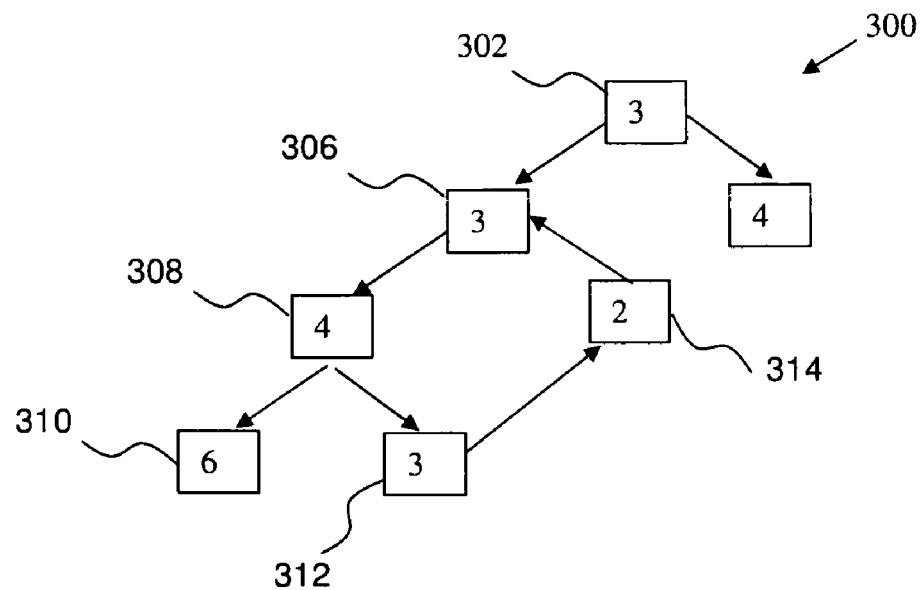
Figure 3H:
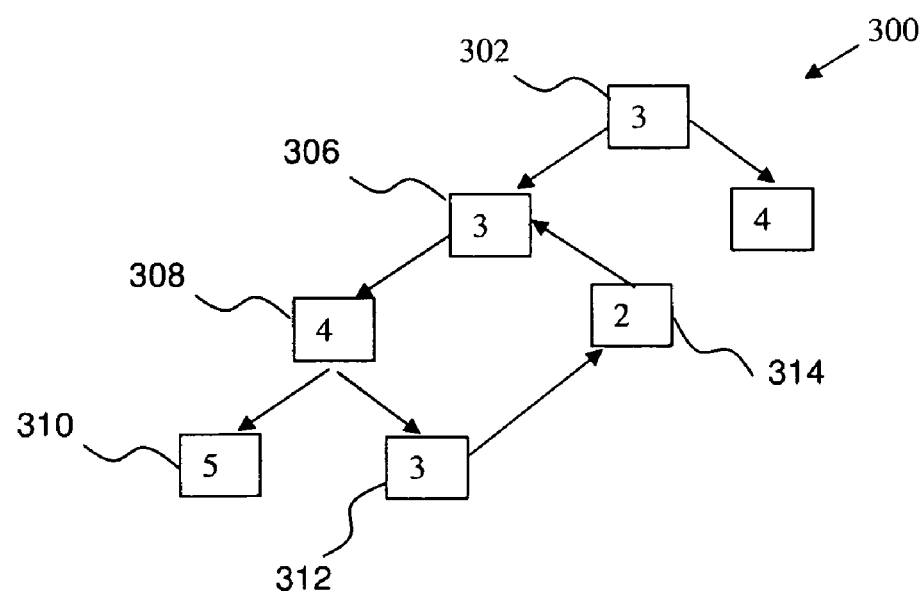

In FIG. 3E a node 314 having an importance value of 2 is added to graph 300, where node 314 is a neighbor of both node 306 and node 312. Being more than one degree of importance lower than node 314, the importance values of nodes 306 and 312 are adjusted to be within one degree of importance of node 314, as is shown in FIG. 3F, requiring in turn a similar adjustment of node 30S, as shown in FIG. 3G, and of node 310, as shown in FIG. 3H.

It will be appreciated that invention is useful where computing resource constraints impose a limit to the number of nodes that may be included in the graph, and that constructing a call graph using importance-based criteria allows nodes that are considered to be more important to be included in the graph before nodes that are considered to be less important, thus resulting in an efficient use of computing resources in constructing the graph.

Figure 4:
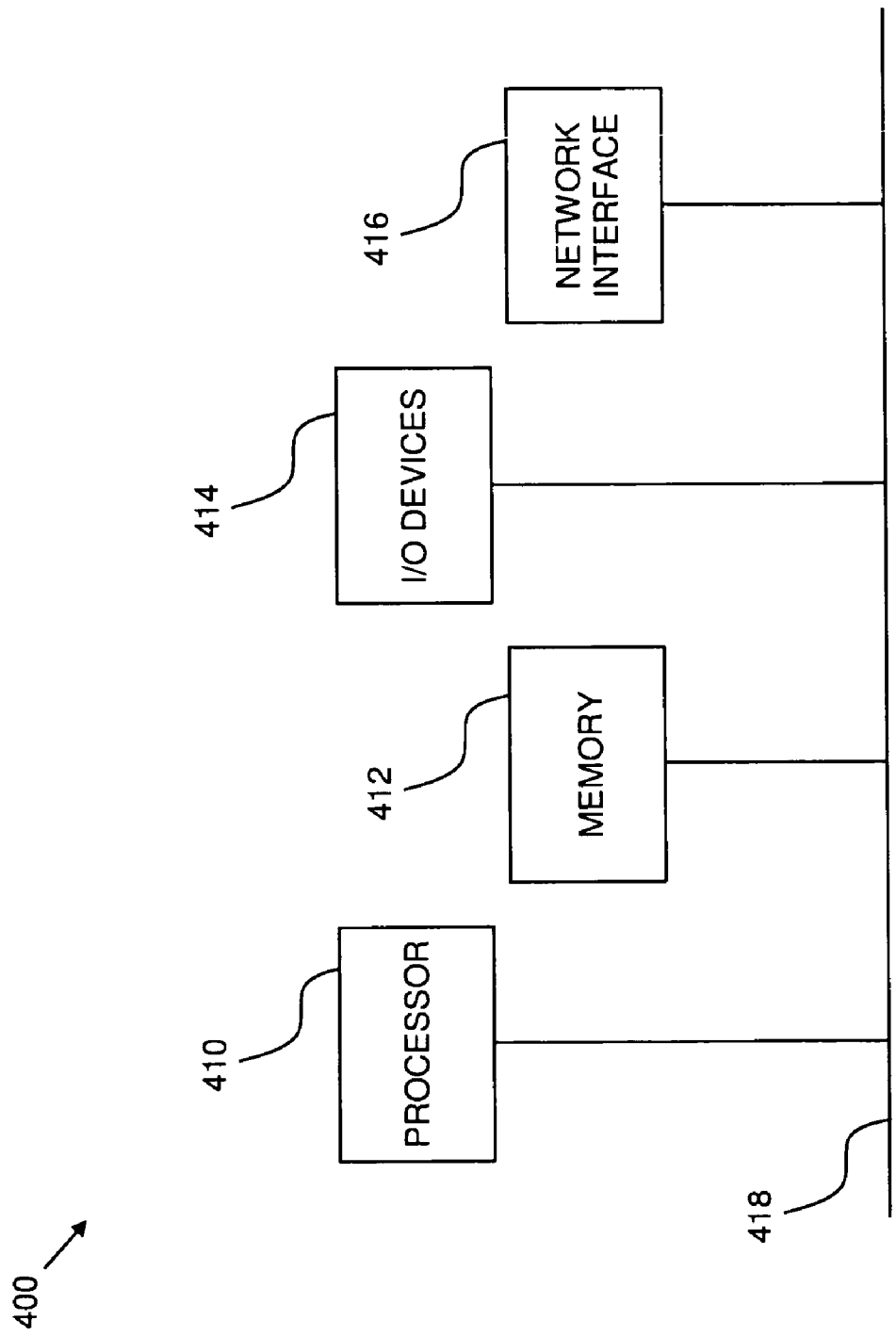
FIG. 4 is a simplified block diagram illustration of an exemplary hardware implementation of a computing system, constructed and operative in accordance with an embodiment of the invention.

Referring now to FIG. 4, a block diagram 400 illustrates an exemplary hardware implementation of a computing system in accordance with which one or more components/methodologies of the invention (e.g., components/methodologies described in the context of FIGS. 1 and 2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g. diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer implemented method for importance-based call graph construction, the method comprising:
   identifying a plurality of calls originating from a root node of a computer software application;
   representing the root node in a call graph; and
   iteratively performing the following steps to construct the call graph until a predefined termination condition is met:
   a) representing the plurality of calls within a candidate pool for inclusion in said call graph;
   b) assigning an importance value to any of said calls in accordance with a predefined importance rule;
   c) selecting any of said calls with a sufficient importance value for inclusion in the call graph;
   d) representing said calls in said call graph; and
   e) adjusting the importance value of any call represented in said call graph in accordance with a predefined importance adjustment rule.

2. A method according to claim 1 wherein said representing step comprises identifying a callee of any of said calls represented in said call graph.

3. A method according to claim 1 wherein said representing step comprises identifying a callee of any of said calls most recently represented in said call graph.

4. A method according to claim 1 wherein said selecting step comprises selecting said call having the greatest importance value among said calls not represented in said call graph.

5. A method according to claim 1 wherein said adjusting step comprises increasing the importance value of any of said calls represented in said call graph such that no call that is represented in said call graph is more important than any of its neighboring calls in said call graph by more than one degree of importance.

6. A method according to claim 1 wherein said predefined termination condition is met when a predefined maximum number of calls are represented in said call graph.

7. A system for importance-based call graph construction, the system comprising processing instructions, implemented in either of computer hardware or computer software stored on a non-tangible computer readable storage media, the instructions operable to:
   identify a plurality of calls originating from a root node of a computer software application;
   represent the root node in a call graph; and
   iteratively perform the following steps to construct the call graph until a predefined termination condition is met:
   represent the plurality of calls within a candidate pool, for inclusion in said call graph:
   assign an importance value to any of said calls in accordance with a predefined importance rule;
   select any of said calls with a sufficient importance value for inclusion in the call graph, and
   represent said calls in said call graph; and
   adjust the importance value of any call represented in said call graph in accordance with a predefined importance adjustment rule.

8. A system according to claim 7 wherein said representing the plurality of calls within a candidate pool further includes identifying a callee of any of said calls represented in said call graph.

9. A system according to claim 7 wherein said representing the plurality of calls within a candidate pool further includes identifying a callee of any of said calls most recently represented in said call graph.

10. A system according to claim 7 wherein said selecting any of said calls for inclusion in the call graph further includes selecting said call having the greatest importance value among said calls not represented in said call graph.

11. A system according to claim 7 wherein adjusting the importance value further includes increasing the importance value of any of said calls represented in said call graph such that no call that is represented in said call graph is more important than any of its neighboring calls in said call graph by more than one degree of importance.

12. A system according to claim 8 wherein said termination condition is met when a predefined maximum number of calls are represented in said call graph.

13. A computer program product for constructing an importance-based call graph, the computer program product comprising:
   a non-transitory computer readable medium storing computer program instructions operative to:
   identify a plurality of calls originating from a root node of a computer software application;
   represent the root node in a call graph; and iteratively perform the following steps to construct the call graph until a predefined termination condition is met:

represent the plurality of calls within a candidate pool for inclusion in said call graph, assign an importance value to any of said calls in accordance with a predefined importance rule, select any of said calls with a sufficient importance value for inclusion in the call graph, represent said calls in said call graph, and adjust the importance value of any call represented in said call graph in accordance with a predefined importance adjustment rule.

14. A computer program product according to claim 13 wherein said computer program instructions to represent the plurality of calls within the candidate pool are operative to identify, a callee of any of said calls represented in said call graph.

15. A computer program product according to claim 13 wherein said computer program instructions to represent the plurality of calls within the candidate pool are operative to identify, a callee of any of said calls most recently represented in said call graph.

16. A computer program product according to claim 13 wherein said computer program instructions to select any of said calls for inclusion in the call graph are operative to selecting said call having the greatest importance value among said calls not represented in said call graph.

17. A computer program product according to claim 13 wherein said computer program instructions to adjust the importance value of any call represented in said call graph are operative to increase the importance value of any of said calls represented in said call graph such that no call that is represented in said call graph is more important than any of its neighboring calls in said call graph by more than one degree of importance.

18. A computer program product according to claim 13 wherein said predefined termination condition is met when a predefined maximum number of calls are represented in said call graph.

* * * * *